(12) United States Patent
Zhang et al.

(10) Patent No.: US 9,441,542 B2
(45) Date of Patent: Sep. 13, 2016

(54) ULTRASONIC WATER ATOMIZATION SYSTEM FOR GAS TURBINE INLET COOLING AND WET COMPRESSION

(75) Inventors: Jianmin Zhang, Greenville, SC (US);
Brad Kippel, Greenville, SC (US);
James Tomey, Greenville, SC (US);
Matthew Johnson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1203 days.

(21) Appl. No.: 13/236,712

(22) Filed: Sep. 20, 2011

(65) Prior Publication Data
US 2013/0067922 A1    Mar. 21, 2013

(51) Int. Cl.
*F02C 7/14* (2006.01)
*F02C 7/143* (2006.01)
*B05B 17/06* (2006.01)

(52) U.S. Cl.
CPC ......... *F02C 7/1435* (2013.01); *B05B 17/0615* (2013.01)

(58) Field of Classification Search
CPC .......................... F02C 7/1435; B05B 17/0615
USPC ....................... 60/772, 775, 39.53; 261/78.2; 239/102.2
See application file for complete search history.

(56) References Cited

U.S. PATENT DOCUMENTS

| | | | |
|---|---|---|---|
| 4,042,016 A | 8/1977 | Boochever et al. | |
| 4,530,464 A * | 7/1985 | Yamamoto et al. | 239/102.2 |
| 4,564,375 A | 1/1986 | Munk et al. | |
| 4,689,895 A | 9/1987 | Taylor et al. | |
| 4,702,074 A | 10/1987 | Munk | |
| 4,731,990 A * | 3/1988 | Munk | 60/775 |
| 4,773,846 A | 9/1988 | Munk | |
| 5,203,161 A | 4/1993 | Lehto | |
| 5,353,585 A | 10/1994 | Munk | |
| 5,463,873 A | 11/1995 | Early et al. | |
| 5,523,028 A * | 6/1996 | Reens et al. | 261/81 |
| 5,843,214 A | 12/1998 | Janes | |
| 6,173,564 B1 | 1/2001 | Zachary | |
| 6,250,064 B1 | 6/2001 | Tomlinson et al. | |
| 6,294,842 B1 | 9/2001 | Skowronski | |
| 6,412,291 B1 | 7/2002 | Erickson | |
| 6,523,346 B1 | 2/2003 | Hoffmann et al. | |
| 6,553,768 B1 | 4/2003 | Trewin et al. | |
| 6,651,314 B2 | 11/2003 | Hopeck | |

(Continued)

FOREIGN PATENT DOCUMENTS

CN    1092136 A    9/1994
EP    0275987 A2   7/1988

(Continued)

OTHER PUBLICATIONS

C. Miller; Title: "Compressor Physics"; GE Proprietary Information: Dated Jan. 15, 2009, pp. 1-10.

(Continued)

*Primary Examiner* — J. Gregory Pickett
(74) *Attorney, Agent, or Firm* — Sutherland Asbill & Brennan LLP

(57) ABSTRACT

The present application provides an inlet air cooling system for cooling a flow air in a gas turbine engine. The inlet air cooling system may include an inlet filter house, a transition piece, an inlet duct, and an inlet ultrasonic water atomization system positioned about the inlet filter house, the transition piece, or the inlet duct to cool the flow of air.

18 Claims, 6 Drawing Sheets

(56) References Cited

U.S. PATENT DOCUMENTS

| | | |
|---|---|---|
| 6,694,766 B1 | 2/2004 | Johnson, Jr. et al. |
| 6,805,483 B2 * | 10/2004 | Tomlinson et al. ............. 60/803 |
| 6,880,343 B2 | 4/2005 | Kopko |
| 6,938,405 B2 | 9/2005 | Carberg et al. |
| D511,377 S | 11/2005 | Erwan et al. |
| 7,353,654 B2 * | 4/2008 | Bolis et al. ..................... 60/775 |
| 7,353,655 B2 | 4/2008 | Bolis et al. |
| 7,428,819 B2 | 9/2008 | Cataldi et al. |
| 7,448,217 B2 * | 11/2008 | Savic et al. ..................... 60/775 |
| 7,454,913 B1 * | 11/2008 | Tassone et al. ................. 60/772 |
| 7,520,137 B2 | 4/2009 | Hoffmann et al. |
| 7,810,742 B2 * | 10/2010 | Levi ........................... 239/102.2 |
| 8,544,826 B2 * | 10/2013 | Ediger et al. ................ 261/78.2 |
| 2002/0073712 A1 | 6/2002 | Kopko |
| 2004/0025513 A1 * | 2/2004 | Walsh et al. .................... 60/775 |
| 2004/0076218 A1 * | 4/2004 | Tomlinson et al. ........... 374/144 |
| 2006/0008533 A1 | 1/2006 | Habich et al. |
| 2006/0254283 A1 * | 11/2006 | Savic et al. ..................... 60/775 |
| 2008/0157409 A1 * | 7/2008 | Reens ........................... 261/118 |
| 2009/0038313 A1 | 2/2009 | Ball, Jr. et al. |
| 2010/0319384 A1 | 12/2010 | Zhang et al. |
| 2010/0326083 A1 * | 12/2010 | Bland .............................. 60/775 |
| 2011/0042836 A1 | 2/2011 | Zhang et al. |
| 2011/0173947 A1 | 7/2011 | Zhang et al. |
| 2012/0205468 A1 * | 8/2012 | Hsieh et al. ................... 239/548 |

FOREIGN PATENT DOCUMENTS

| | | |
|---|---|---|
| EP | 0301757 A2 | 2/1989 |
| EP | 0326032 A2 | 8/1989 |
| EP | 0358451 A1 | 3/1990 |
| EP | 0400701 A1 | 12/1990 |
| EP | 0447134 A1 | 9/1991 |
| EP | 0518186 A1 | 12/1992 |
| EP | 0524435 A2 | 1/1993 |
| EP | 0525803 A1 | 2/1993 |
| EP | 0585768 A1 | 3/1994 |
| EP | 0604874 A1 | 7/1994 |
| EP | 0667499 A1 | 8/1995 |
| EP | 0852164 A1 | 7/1998 |
| EP | 1 108 870 A2 | 6/2001 |
| EP | 1832751 A1 | 9/2007 |
| EP | 1903188 A2 | 3/2008 |
| EP | 1914481 A2 | 4/2008 |
| EP | 1923651 A1 | 5/2008 |
| EP | 1929982 A2 | 6/2008 |
| EP | 1930063 A1 | 6/2008 |
| EP | 1935500 A2 | 6/2008 |
| EP | 1 961 937 A2 | 8/2008 |
| EP | 2008286503 A | 11/2008 |
| JP | 6024154 A | 2/1985 |
| JP | 10037763 A | 2/1998 |
| JP | 10238368 A | 9/1998 |
| JP | 2006084073 A | 3/2006 |
| JP | 2006084074 A | 3/2006 |

OTHER PUBLICATIONS

Unofficial English Translation of Chinese Office Action issued in connection with corresponding CN Application No. 201210350726.9 on Jun. 23, 2015.

* cited by examiner

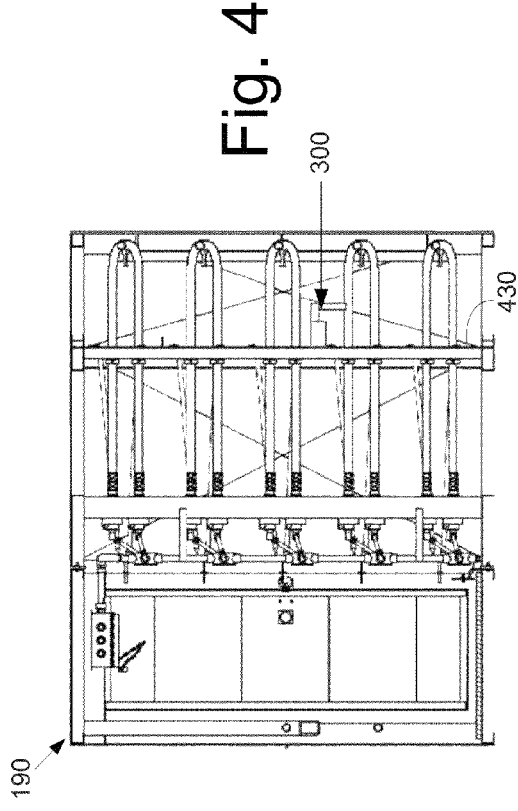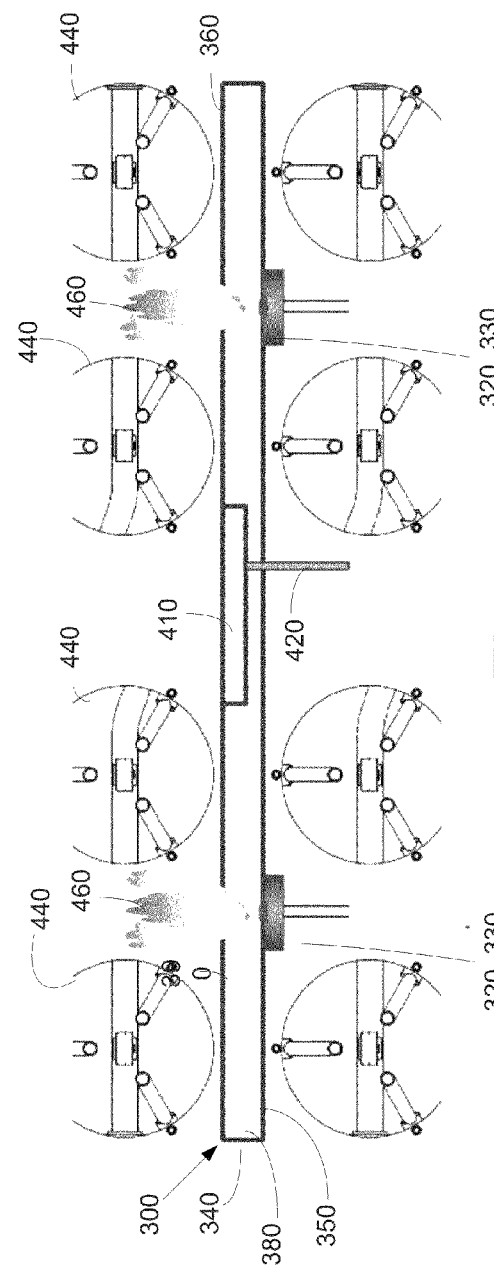

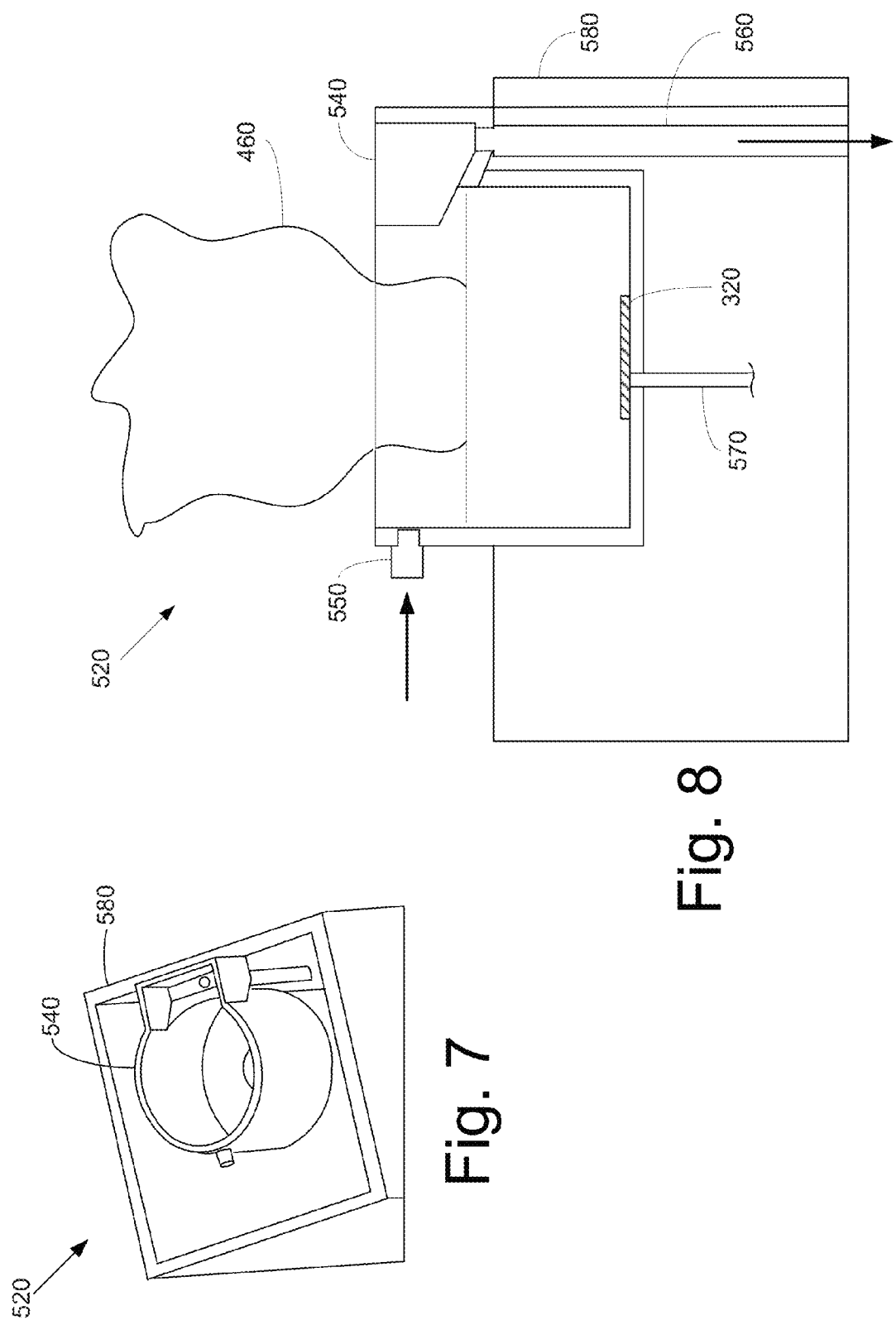

ULTRASONIC WATER ATOMIZATION SYSTEM FOR GAS TURBINE INLET COOLING AND WET COMPRESSION

TECHNICAL FIELD

The present application and the resultant patent relate generally to gas turbine engines and more particularly relate to an ultrasonic water atomization system for evaporative cooling about a gas turbine inlet for power augmentation as well as for wet compression with minimized erosion of compressor blades.

BACKGROUND OF THE INVENTION

Various strategies are known for increasing the amount of power that a gas turbine engine may be able to produce. One method of increasing the power output of a gas turbine engine is by cooling the inlet air before compressing it in the compressor. Such inlet cooling causes the air to have a higher density so as to create a higher mass flow rate into the compressor. The higher mass flow rate of the air in a compressor allows more air to be compressed so as to allow the gas turbine engine to produce more power.

One type of cooling system involves latent or evaporative cooling. Such a system uses water at ambient temperature to cool the air by dropping the air temperature due to water evaporation. One example of such a system is a media-based evaporative cooler that operates by running water over plates or over a cellular media inside of a chamber and then drawing the air through the chamber to evaporate the water. Another example of an evaporative cooling system utilizes a high-pressure nozzle spray system to spray water into the air for evaporation. Evaporative cooling can cool the incoming air to near its wet bulb temperature. Evaporative cooling can be an efficient method of cooling the inlet air because there is only a minimal amount of parasitic power that is required to run the evaporative cooling system as compared to other types of inlet cooling system such as coil cooling systems and the like.

Another power augmentation method is the use of wet compression. Wet compression generally involves spraying water droplets into the inlet of the compressor. When the mixture of gas and water is compressed, the temperature of the gas increases and provides the driving potential for evaporation. The evaporation of the water cools the gas and, hence, increases the available power by reducing the work required for compression.

Issues with known evaporative cooling systems may include flow resistance pertaining to a media-type evaporative cooler. The typical pressure drop caused by the media-type evaporative cooler to the gas turbine inlet airflow may be in the range of about 0.25 to about 0.75 inches water column (about 0.635 to about 1.9 centimeters). Other issues with evaporative cooling and wet compression include high nozzle abrasion rates found in water spray evaporative cooling systems, i.e., high nozzle abrasion rates caused by the high speed jet flows through the spray nozzles. Another problem is the requirement of costly high pressure water supply systems to supply high-pressure evaporative cooling and wet compression spray systems. Further, there is also the risk of unevaporated large water droplets from evaporative cooling or wet compression systems entering the compressor and causing erosion or other damage to the compressor blades.

There is thus a desire for an improved gas turbine inlet evaporative cooling system as well as a wet compression system. Such systems may reduce the pressure drop thereacross, eliminate or avoid nozzle abrasion, utilize standard low pressure water supply systems, and prevent downstream damage to the compressor blades by unevaporated large water droplets. Moreover, such systems should provide power augmentation without being a significant parasitic power loss on the gas turbine engine as a whole. The gains of power augmentation are less limited by the high ambient relative humidity conditions than those found in the gas turbines using only media-type evaporative cooling.

SUMMARY OF THE INVENTION

The present application and the resultant patent thus provide an inlet air cooling system for cooling a flow air in a gas turbine engine. The inlet air cooling system may include an inlet filter house, a transition piece, an inlet duct, and an inlet ultrasonic water atomization system positioned about the inlet filter house, the transition piece, or the inlet duct to cool the flow of air.

The present application and the resultant patent further provide a method of cooling an incoming flow of air for a compressor of a gas turbine engine. The method may include the steps of atomizing a volume of water upstream of the compressor, creating a fine water mist, mixing the fine water mist into the incoming flow of air, cooling the flow of air with the fine water mist, and evaporating substantially the fine water mist before reaching the compressor.

The present application and the resultant patent further provide a wet compression system for reducing the work required for a compressor of a gas turbine engine. The wet compression system may include an inlet filter house, an inlet ultrasonic water atomization system positioned about the inlet filter house, and a downstream ultrasonic water atomization system positioned about the compressor.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 4 is a side plan view of an inlet filter house of the inlet air cooling system of FIG. 1 with the ultrasonic water atomization system.

FIG. 5 is a front plan view of the inlet filter house of the inlet air cooling system of FIG. 1 with the ultrasonic water atomization system.

FIG. 7 is a perspective view of a downstream ultrasonic water atomization system as may be described herein.

FIG. 8 is a side view of the downstream ultrasonic water atomization system of FIG. 7.

DETAILED DESCRIPTION

Figure 1:
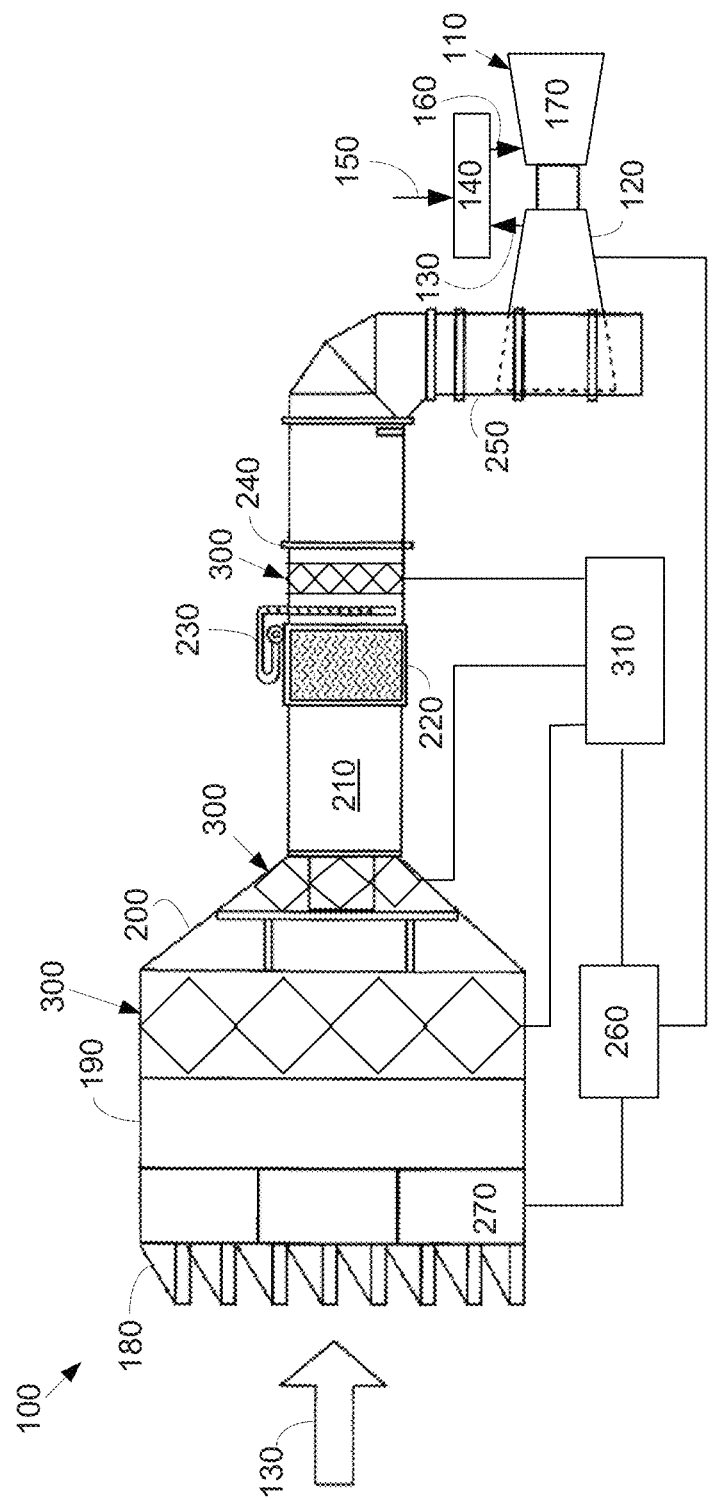
FIG. 1 is a schematic view of a gas turbine engine with an inlet air cooling system as may be described herein.

Referring now to the drawings, in which like numerals refer to like elements throughout the several views, FIG. 1 shows an inlet air cooling system 100 as may be described herein. The inlet air cooling system 100 may be used with a gas turbine engine 110. The gas turbine engine 110 may include a compressor 120. The compressor 120 compresses an incoming flow of air 130. The compressor 120 delivers the compressed flow of air 130 to a combustor 140. The combustor mixes the compressed flow of air 130 with a pressurized flow of fuel 150 and ignites the mixture to create a flow of combustion gases 160. The flow of combustion gases 160 is in turn delivered to a turbine 170. The flow of combustion gases 160 drives the turbine 170 so as to produce mechanical work. The gas turbine engine 110 may use natural gas, various types of syngas, and other types of fuels. The gas turbine engine 110 may be any one of a number of different gas turbine engines offered by General Electric Company of Schenectady, N.Y. and the like. Other components and other configurations may be used herein.

The inlet air cooling system 100 may include a weatherhood 180 mounted on an inlet filter house 190 for the incoming flow of air 130 to pass therethrough. The weatherhood 180 may prevent weather elements such as rain, snow, and the like from entering therein. The weatherhood 180 and the inlet filter house 190 may be largely of conventional design. The flow of air 130 then may flow through a transition piece 200 and an inlet duct 210. A silencer section 220 and an inlet bleed heat system 230 also may be used herein. One or more screens 240 may be used to deflect larger types of contaminants or debris. The flow of air 130 then may pass through an inlet plenum 250 and into the compressor 120 for compression and combustion as described above. Other components and other configurations may be used herein.

Operation of the inlet air cooling system 100 and the gas turbine engine 110 may be controlled by a controller 260. The controller 260 may be programmed with various control algorithms and other types of software so as to operate and regulate the inlet air cooling system 100 and the gas turbine engine 110. Multiple controllers 260 may be used herein. The controller 260 may determine the power output to the gas turbine engine 110 and other parameters via a number of sensors. Likewise, the controller 260 may be able to determine ambient conditions via a weather station 270. The weather station 270 may be positioned about the inlet filter house 190 or elsewhere. Many different types of operating parameters may be accommodated herein. Other configurations and other components may be used herein.

The inlet air cooling system 100 also may include an inlet ultrasonic water atomization system 300. As is shown in FIG. 1, the inlet ultrasonic water atomization system 300 may be positioned about the inlet filter house 190, about the transition piece 200, or about the inlet duct 210. Although three (3) different locations are shown, only one (1) location may be used herein. The inlet ultrasonic water atomization system 300 may be in communication with a pump skid 310. The pump skid 310 may have a volume of water therein. The water may be demineralized, desalinated, and the like. The water may be supplied at low pressure (under about 150 psi). Other types of water sources may be used herein.

Figure 2:
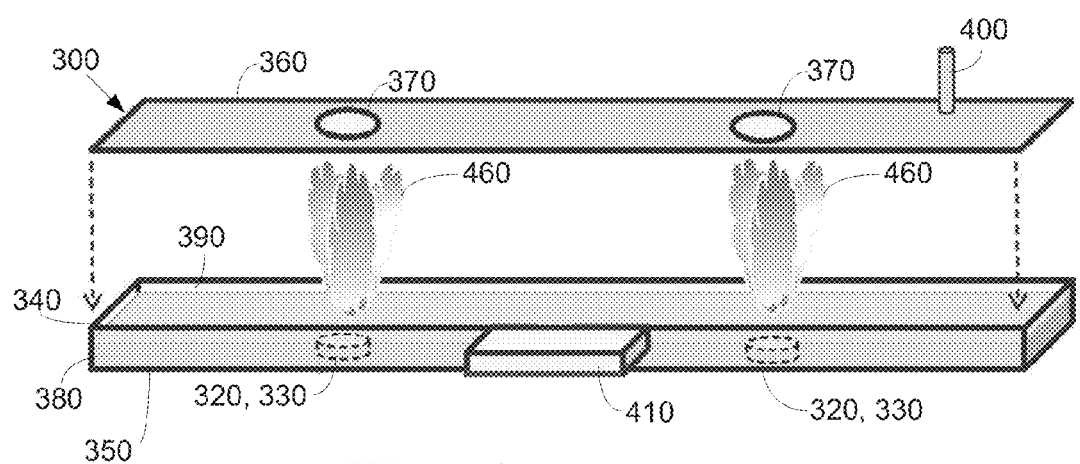
FIG. 2 is an exploded perspective view of an ultrasonic water atomization system as may be described herein.

As is shown in FIG. 2, the inlet ultrasonic water atomization system 300 may include a number of ultrasonic water atomizers 320 therein. Specifically, the ultrasonic water atomizers 320 may be a number of piezoelectric ceramic ultrasonic atomizers 330. The piezoelectric ceramic ultrasonic atomizers 330 rely on piezoelectric ceramic vibration to atomize water. The atomized water may take the form of consistent single digit micron sized water droplets of less than about ten (10) microns. Such consistently sized small water droplets may be effective in reducing potential compressor blade erosion and the like.

Figure 3A:
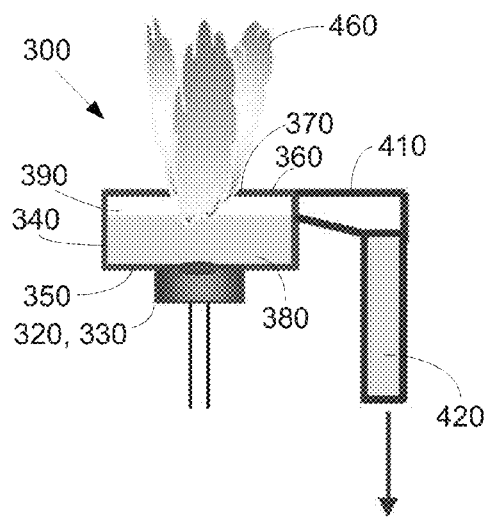
FIG. 3A is a side plan view of the ultrasonic water atomization system of FIG. 2.
Figure 3B:
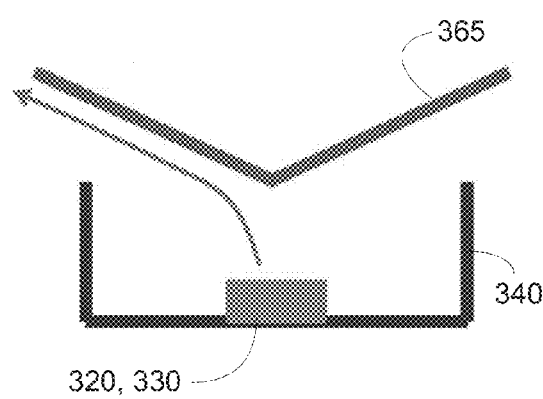
FIG. 3B is a side plan view of the ultrasonic water atomization system with an alternative cover.

As is shown in FIGS. 2 and 3A, the ultrasonic water atomization system includes a number of water trays or water tanks 340. The water tanks 340 may have any desired size, shape, or configuration. The water tanks 340 may include a base 350. The ultrasonic water atomizers 320 may be positioned about the base 350 of the water tanks 340. The water tank 340 also may have a cover 360 thereon. The cover 360 may have a number of apertures 370 therein. The apertures 370 of the cover 360 may align with the ultrasonic water atomizers 320 of the base 350. A volume of water 380 may be positioned within the tank 340. An air gap 390 may extend between the water 380 and the cover 360. The volume of water 380 and the extent of the air gap 390 may vary. An incoming water supply line 400 may be positioned about the cover 360. An overflow drain 410 and an outgoing waterline 420 may be positioned about the base 350. As is shown in FIG. 3B, a V-shaped cover 365 also may be used. Other components and other configurations may be used herein.

As is shown in FIGS. 4 and 5, the inlet ultrasonic water atomization system 300 may be positioned about the inlet filter house 190. A number of the water tanks 340 with the ultrasonic water atomizers 320 positioned thereon may be attached to a filter mounting plate 430 or elsewhere. (Although only one water tank 340 is shown in FIG. 4, any number may be used.) The water tanks 340 may be positioned behind a number of filter element mounting holes 440. The outgoing water lines 420 may be in communication with a sump line or other type of out-going line. As described above, a similar configuration of the inlet ultrasonic water atomization system 300 also may be positioned about the transition piece 200, about the inlet duct 210, or about any type of internal support structure and the like. Other components and other configurations also may be used herein.

In use, the ultrasonic water atomizers 320 vibrate the volume of water 380 within the water tanks 380 to create a fine water mist 460. Larger water droplets may rise above the surface of the water 380 but not high enough into the air gap 390 so as to escape through the apertures 370. The smaller droplets of the fine water mist 460 rise above the surface of the water 380 due to buoyancy and escape through the air gap 390 and the apertures 370. Specifically, the droplets of the fine water mist 460 are lighter than air and hence rise due to buoyancy as opposed to being injected into the flow of air 130. As such, only the fine water mist 460 is presented to and entrained with the incoming flow of air 130. Alternatively, the fine water mist in the flow of air 130 may be directed via the V-shaped cover 365.

The fine water mist 460 produced herein ensures acceptable flow rates while preventing larger droplets from entering the flow or air flow 130 and possibly damaging the compressor blades. Moreover, the use of the ultrasonic water atomizers 320 provide a kind of "fail safe" in that if the ultrasonic water atomizers 320 somehow fail, the result simply would be the lack of the fine water mist 460. This is in contrast to injection type nozzles that may provide large water droplets if the incoming water pressure is somehow reduced or if the nozzles degrade. Such large water droplets may cause damage downstream.

The inlet ultrasonic water atomization system 300 thus provides the fine water mist 460 with a negligible pressure drop thereacross as is takes advantage of not adding flow path obstructions. The use of water evaporation in the inlet air cooling system 110 effectively reduces the temperature of the inlet air flow 130 and therefore allows a higher turbine air mass flow for power augmentation. The water evaporation rate and the overall droplet distribution may be controlled via the controller 260 based upon power output demand, ambient conditions, and other parameters.

The inlet ultrasonic water atomization system 300 may deliver the fine water mist 460 at any angle and flow rate so as to enhance evaporation therein. Moreover, the inlet ultrasonic atomization system 300 features fully retained components that cannot be released into the incoming flow of air 130 and cause downstream damage to the compressor. The inlet ultrasonic water atomization system 300 may be original equipment in the inlet air cooling system 100 or may be part of a retrofit.

Figure 6:
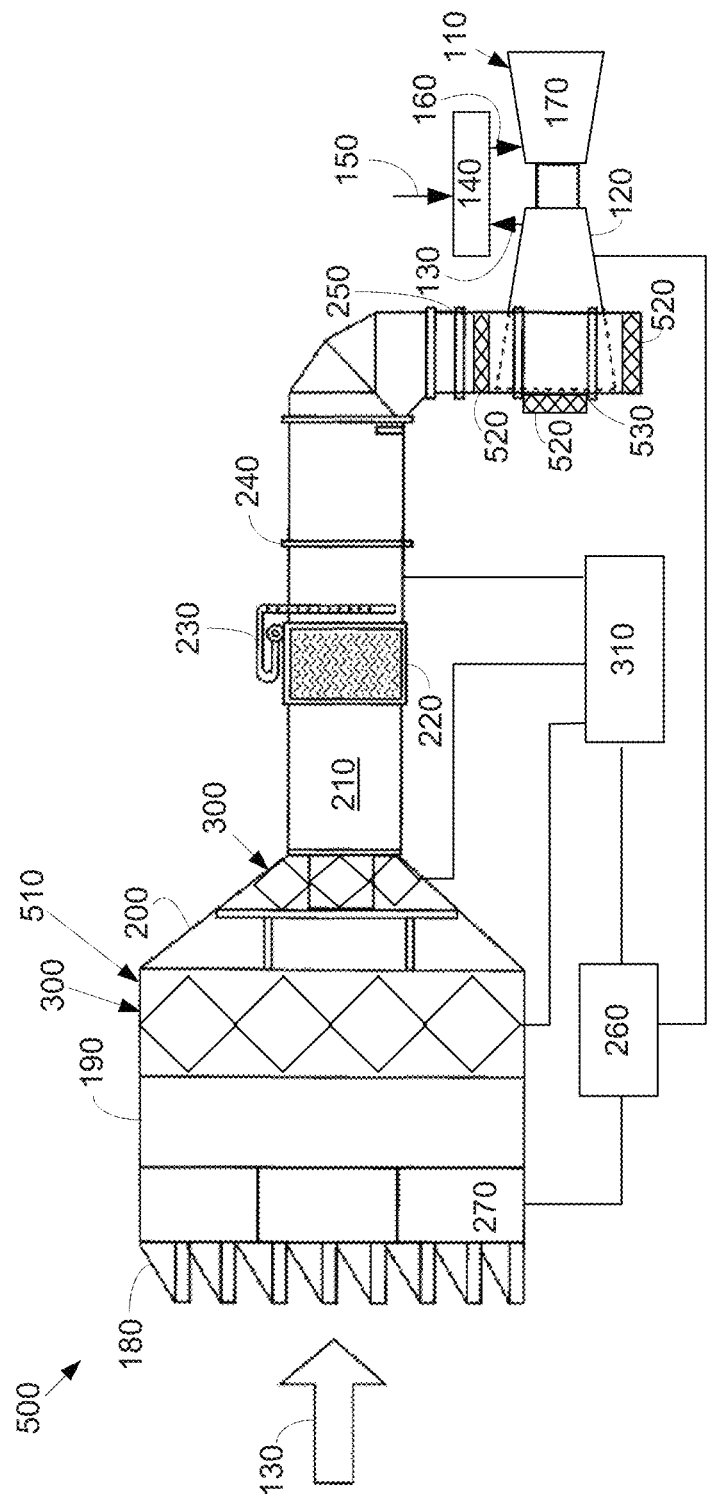
FIG. 6 is a schematic view of a gas turbine engine with a wet compression system as may be described herein.

FIG. 6 shows a wet compression system 500 as may be described herein. The wet compression system 500 may use a two stage ultrasonic water atomization system 510. Specifically, the two stage ultrasonic water atomization system 510 may use the inlet ultrasonic water atomization system 300 as a first stage and a downstream ultrasonic water atomization system 520 as a second stage. In this example, the inlet ultrasonic water atomization system 300 may be positioned about the inlet filter house 190 or the transition piece 200. The downstream ultrasonic water atomization system 520 may be positioned about the inlet plenum 250 or about a bellmouth 530 about the compressor 20. Other positions may be used herein. Other components and other configurations may be used herein.

Figure 10:
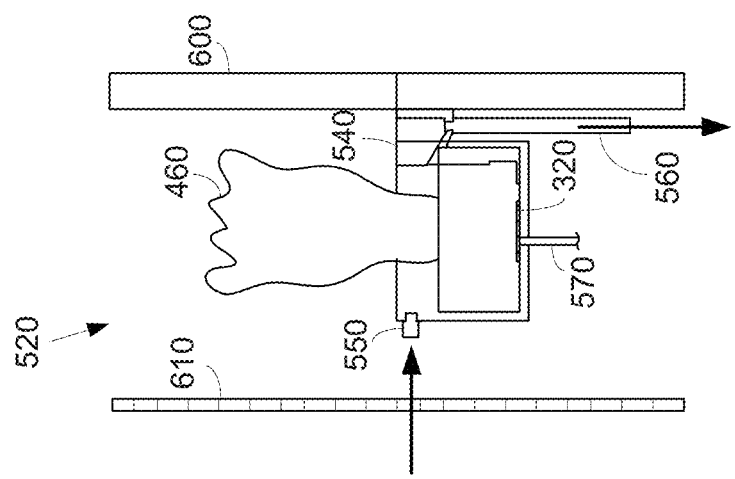
FIG. 10 is a side view of an alternative embodiment of a downstream ultrasonic water atomization system as may be described herein.
Figure 9:
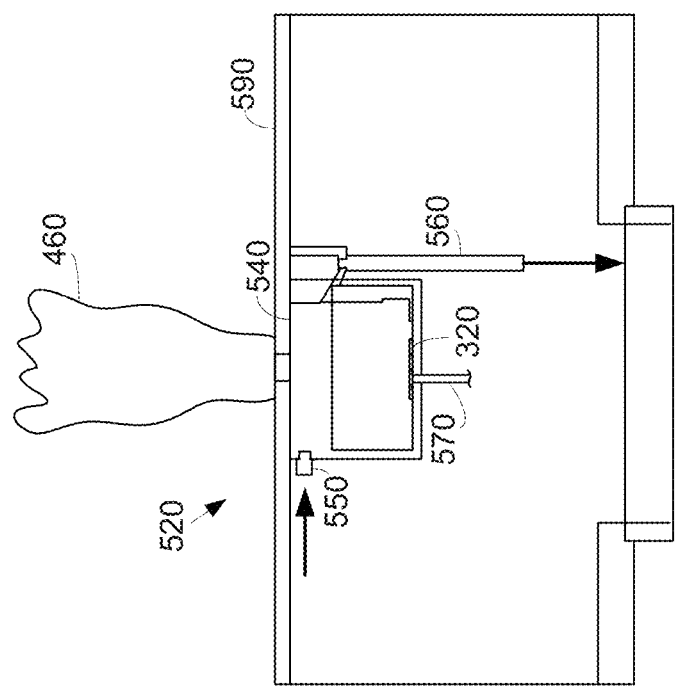
FIG. 9 is a side view of an alternative embodiment of a downstream ultrasonic water atomization system as may be described herein.

As is shown in vertical member cut-away views in FIGS. 7 and 8, the downstream ultrasonic water atomization system 520 may use a number of the ultrasonic water atomizers 320 in a well-type arrangement 540. Specifically, a piezoelectric ultrasonic water atomizer 320 may be positioned in a well 540. The well 540 may have any size, shape, or configuration. FIGS. 7 and 8 do not show a cover for simplicity although a cover 360 or openings in the vertical member 580 may be used. The well 540 may include a water supply line 550 and an overflow drain 560. A power line 570 also may be used. The well 540 may be mounted on a vertical member 580 in the flow path as is shown in FIGS. 7 and 8, on a horizontal member 590 in the flow path as is shown in FIG. 9, about a wall 600 as is shown in FIG. 10, or elsewhere. The wall 600 may be any type of duct wall, floor, and the like. A screen or a perforated sheet 610 also may be used herein. Other components and other configurations may be used herein.

In use, the wet compression system 500 uses the two stage ultrasonic water atomization system 510. As the first stage, the inlet ultrasonic water atomization system 300 provides the fine water mist 460 to cool the inlet flow of air 130 via evaporative cooling. The fine water mist 460 also brings the flow of air 130 close to its saturation point. The downstream ultrasonic water atomization system 520 then injects a further fine water mist 460 into the flow of air 130. Due to the fact that the fine water mist 460 from the inlet ultrasonic water atomization system 300 is close to saturation, the fine water mist 460 introduced by the downstream ultrasonic water atomization system 520 remains non-vaporized and is carried into the compressor 120. As the air 130 and the fine water mist 460 are compressed within the compressor 120, the temperature and pressure increase. Because of the entrained water mist 460, some of the compression heat is absorbed by the water latent heat. This absorption thus reduces the work of the compressor 120 and enhances overall power output.

The wet compression system 500 thus uses the inlet ultrasonic water atomization system 300 for cooling and power augmentation through increased mass flow and the downstream ultrasonic atomization system 520 for intercooling and reducing the work of the compressor 120. Moreover, the components of the downstream ultrasonic water atomization system 520 may be positioned anywhere within the inlet framework without disrupting the inlet flow of air 130. Further, the downstream ultrasonic water atomization system 520 acts as a fail safe in that large water droplets will not be injected into the compressor 120 so as to cause damage to downstream components.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet air cooling system for cooling a flow air in a gas turbine engine, comprising:
    an inlet filter house;
    a transition piece;
    an inlet duct; and
    an inlet ultrasonic water atomization system positioned about the inlet filter house, the transition piece, or the inlet duct to cool the flow of air;
    wherein the inlet ultrasonic water atomization system comprises:
        a water tank with an air gap and a volume of water therein, the water tank comprising a V-shaped cover aligned with the inlet ultrasonic water atomization system and configured to direct about half of a fine water mist generated by the inlet ultrasonic water atomization system in a first direction and about half of the fine water mist generated by the inlet ultrasonic water atomization system in a second direction;
        a water supply line configured to direct water to the water tank; and
        an overflow drain configured to drain water from the water tank.

2. The inlet air cooling system of claim 1, further comprising a pump skid in communication with the inlet ultrasonic water atomization system.

3. The inlet air cooling system of claim 1, wherein the inlet ultrasonic water atomization system comprises a plurality of ultrasonic water atomizers.

4. The inlet air cooling system of claim 1, wherein the inlet ultrasonic water atomization system comprises a plurality of piezoelectric ceramic ultrasonic water atomizers.

5. The inlet air cooling system of claim 1, wherein the water tank comprises a cover with one or more apertures therein and wherein the one or more apertures align with one or more ultrasonic water atomizers.

6. The inlet air cooling system of claim 1, wherein the inlet ultrasonic water atomization system produces a fine water mist to cool the flow of air.

7. The inlet air cooling system of claim 1, wherein the inlet filter house comprises a filter mounting plate and wherein the inlet ultrasonic water atomization system is mounted on the filter mounting plate.

8. The inlet air cooling system of claim 1, further comprising a downstream ultrasonic water atomization system.

9. The inlet air cooling system of claim 8, wherein the downstream ultrasonic water atomization system comprises a well.

10. The inlet air cooling system of claim 8, wherein the downstream ultrasonic water atomization system is positioned about an inlet plenum or a bellmouth.

11. The inlet air cooling system of claim 1, wherein the air gap is in between the outlet of the water supply line and the volume of water in the water tank.

12. The inlet air cooling system of claim 1, wherein the first direction and the second direction correspond to the V-shape of the V-shaped cover.

13. A method of cooling an incoming flow of air for a compressor of a gas turbine engine, comprising:
   directing a volume of water to a water tank of an inlet ultrasonic water atomization system via a water supply line, the water tank comprising a V-shaped cover aligned with the inlet ultrasonic water atomization system;
   draining an overflow of water from the water tank via an overflow drain;
   atomizing the volume of water upstream of the compressor;
   creating a fine water mist, wherein the fine water mist rises above a surface of the volume of water into an air gap above the volume of water;
   directing about half of the fine water mist generated by the inlet ultrasonic water atomization system in a first direction;
   directing about half of the fine water mist generated by the inlet ultrasonic water atomization system in a second direction;
   mixing the fine water mist into the incoming flow of air;
   cooling the flow of air with the fine water mist; and
   evaporating substantially the fine water mist before reaching the compressor.

14. A wet compression system for reducing the work required in a compressor of a gas turbine engine, comprising:
   an inlet filter house;
   an inlet ultrasonic water atomization system positioned about the inlet filter house; and
   a downstream ultrasonic water atomization system positioned about the compressor;
   wherein the inlet ultrasonic water atomization system comprises:
      a water tank with an air gap and a volume of water therein, the water tank comprising a V-shaped cover aligned with the inlet ultrasonic water atomization system and configured to direct about half of a fine water mist generated by the inlet ultrasonic water atomization system in a first direction and about half of the fine water mist generated by the inlet ultrasonic water atomization system in a second direction;
      a water supply line configured to direct water to the water tank; and
      an overflow drain configured to drain water from the water tank.

15. The wet compression system of claim 14, wherein the water tank comprises a cover thereon.

16. The wet compression system of claim 15, wherein the downstream ultrasonic water atomization system comprises a perforated sheet positioned about the water tank.

17. The wet compression system of claim 14, wherein the downstream ultrasonic water atomization system is positioned about an inlet plenum or a bellmouth of the compressor.

18. The wet compression system of claim 14, wherein the downstream ultrasonic water atomization system is positioned about a vertical or a horizontal member.

* * * * *